J. M. KELLER.
SPRING TIRE.
APPLICATION FILED NOV. 21, 1910.
1,004,658.
Patented Oct. 3, 1911.
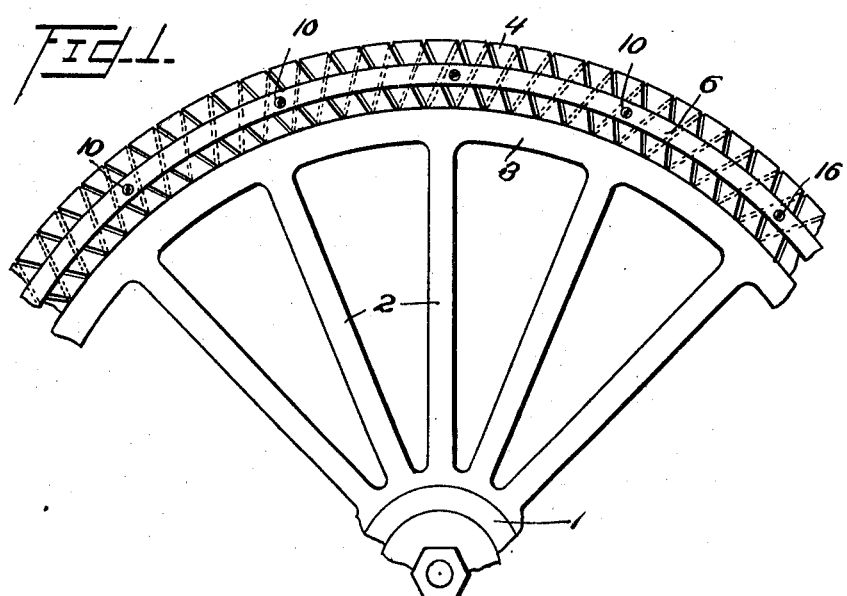
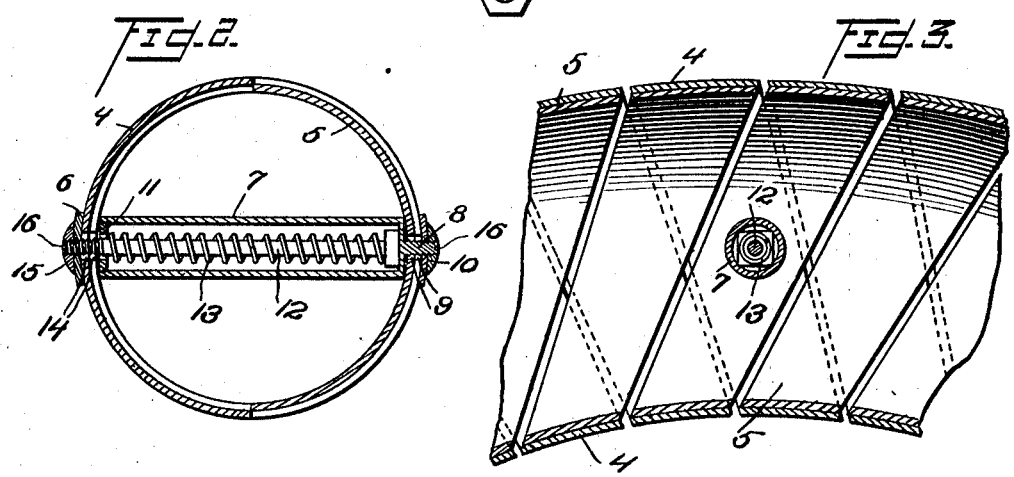
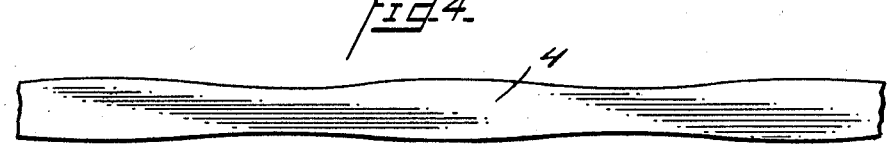
Witnesses
H. Strauss
R. H. Krenkel
Inventor
Joseph M. Keller,
By Joshua R. H. Potts,
Attorney

UNITED STATES PATENT OFFICE.

JOSEPH M. KELLER, OF PHILADELPHIA, PENNSYLVANIA.

SPRING-TIRE.

1,004,658.  Specification of Letters Patent.  Patented Oct. 3, 1911.

Application filed November 21, 1910. Serial No. 593,317.

*To all whom it may concern:*

Be it known that I, JOSEPH M. KELLER, a citizen of the United States, residing at Philadelphia, in the county of Philadelphia and State of Pennsylvania, have invented certain new and useful Improvements in Spring-Tires, of which the following is a specification.

My invention relates to improvements in spring tires, the object of the invention being to provide an improved construction of double convolute spring strips, in combination with transversely disposed springs aiding the elasticity of the convolute strips to sustain the weight and lateral stresses on the tire.

A further object is to provide a tire of this character which acts as an inner tube dispensing with the necessity for an inflated tube, hence, precluding any possibility of bursting when the tire is punctured, for a spring tire of this character will be practically puncture proof.

With these and other objects in view, the invention consists in certain novel features of construction and combinations and arrangements of parts, as will be more fully hereinafter described and pointed out in the claims.

In the accompanying drawings: Figure 1, is a fragmentary view in side elevation illustrating my improvements. Fig. 2, is an enlarged view in cross section. Fig. 3, is an enlarged fragmentary view in longitudinal section, and Fig. 4, is a fragmentary plan view of one of the spring metal strips used in forming the tire.

1, represents a wheel hub, 2 the spokes, and 3 the felly constituting the rim on which my improved tire is located. The tire is made of two strips of spring metal 4 and 5, both of which are precisely alike, and a fragment of one being shown in Fig. 4. These strips are coiled in opposite directions as shown most clearly in Figs. 1 and 3, and each strip is alternately relatively wide, and narrow, and the outer edges gradually curving toward each other, and then gradually curving outward from each other in a general slight compound curve, so that the narrower portions of the strips come at the inner portions of the tire, while the wider portions are at the outer portion of the tire.

The convolutions are spaced apart, and the particular shape of strip is necessary in order to maintain a uniform spacing of the convolutions, for the smaller diameter of the inner portion of the tire necessitates a narrower portion of the strip to maintain a uniform spacing of the convolutions. At both sides of the tire, flat metal rings 6 are disposed, and these rings are connected by elastic devices as shown most clearly in Figs. 2 and 3. Each elastic device comprises a cylinder 7 extending transversely across the inside of the tube, having an open end and a closed end. An integral screw-threaded lug 8 is provided on the closed end of the cylinder 7, and projects through openings 9 in the tube, said openings being appreciably larger than the lug 8 to allow movement of the tube on the lug. This lug 8 is screwed through a threaded opening in one ring 6, and a nut 10 is screwed on the outer end of this lug against the ring. The open end of the cylinder 7 is internally screw-threaded to receive a disk 11 having a central opening. A bolt 12 is located in the cylinder 7 with its headed end against the closed end of the cylinder, and a coiled spring 13 is located around the bolt, bears at one end against the head of the bolt, and at its other end against disk 11. The bolt 12 projects through the central opening in disk 11 and through somewhat enlarged openings 14 in the tube, and its screw-threaded end engages in screw-threads in an opening in ring 6, while a nut 15 is screwed on the outer end of the bolt against the ring 6. These nuts 10 and 15 are convex on their outer faces and the said nuts 10, and 15, the lug 8, and the end of bolt 12, are provided with screw-driver or spanner receiving grooves 16 to facilitate their manipulation. As above stated, these elastic devices are located at regular intervals, and serve to withstand the greater pressure on the tube as it is expanded transversely. For example, any weight on the tube will cause the bolt 12 and the cylinder 7 to be moved in opposite directions, and contract the spring 13, hence the elasticity of said spring will afford the desired elasticity to the tube. I do not, of course, limit myself to any particular number of these transverse elastic devices, nor to their location with reference to the other parts of the wheel. Said cushioning devices are formed in the tube as it is made, and the several parts are positioned inside the tube from its open end as it is being formed.

While, of course, the strips 4 and 5 will be as long as possible, it may be necessary in some instances to connect the ends of the strips, and if so, such connections will be formed at the inner portions of the tire or tube.

While I have referred to my improvement as a tire or tube using these terms indiscriminately, it is to be understood it is, as a matter of fact, an inner spring tube designed to hold distended an outer tire of rubber or other flexible material taking the place of the ordinary inflated tube.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A tire tube, comprising two strips of spring metal having oppositely disposed convolutions crossing each other, said strips spaced apart, each strip proportionately widest at regular intervals, proportionately narrowest at equal distances between the widest portions, the outer edges of said strips having a compound curvature, rings located at opposite sides of the tube, and elastic connecting devices inside of the tube projecting through the tube and rings, and securing devices against the outer faces of said rings holding said elastic devices, substantially as described.

2. A tire tube, comprising strips of spring metal oppositely coiled, the convolutions of one coil crossing the other, said convolutions spaced apart, rings against the outer faces of said tube, said tube and said rings having openings therein, an elastic device comprising a cylinder having an open end and a closed end, a threaded lug on the closed end of said cylinder projecting through openings in the tube and ring, a disk screwed into the open end of said cylinder and having an opening in its center, a bolt projecting through said opening in the disk and having a head at its inner end, said bolt projecting through the openings in the tube and ring, nuts screwed onto said bolt and said lug, and a coiled spring in said cylinder around said bolt and located between the head of said bolt and said disk, substantially as described.

3. A tire tube, comprising strips of spring metal oppositely coiled, the convolutions of one coil crossing the other, said convolutions spaced apart, rings against the outer faces of said tube, said tube and said rings having openings therein, an elastic device comprising a cylinder having an open end and a closed end, a threaded lug on the closed end of said cylinder projecting through openings in the tube and ring, a disk screwed into the open end of said cylinder and having an opening in its center, a bolt projecting through said opening in the disk and having a head at its inner end, said bolt projecting through the openings in the tube and ring, nuts screwed onto said bolt and said lug, a coiled spring in said cylinder around said bolt and located between the head of said bolt and said disk, said openings in the tube being appreciably larger than the diameters of the lug and bolt, and said nuts having convex outer faces, substantially as described.

In testimony whereof I have signed my name to this specification in the presence of two subscribing witnesses.

JOSEPH M. KELLER.

Witnesses:
  R. H. KRENKEL,
  C. E. POTTS.

---

Copies of this patent may be obtained for five cents each, by addressing the "Commissioner of Patents, Washington, D. C."